US011720786B2

(12) United States Patent
Tate et al.

(10) Patent No.: US 11,720,786 B2
(45) Date of Patent: Aug. 8, 2023

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Shunta Tate, Tokyo (JP); Masakazu Matsugu, Yokohama (JP); Yasuhiro Komori, Tokyo (JP); Takayuki Saruta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1037 days.

(21) Appl. No.: 15/713,470

(22) Filed: Sep. 22, 2017

(65) Prior Publication Data

US 2018/0089564 A1 Mar. 29, 2018

(30) Foreign Application Priority Data

Sep. 27, 2016 (JP) .................. 2016-188412

(51) Int. Cl.
*G06N 3/08* (2006.01)
*G06N 3/04* (2006.01)
G06N 3/084 (2023.01)

(52) U.S. Cl.
CPC ............ *G06N 3/08* (2013.01); *G06N 3/0454* (2013.01); *G06N 3/084* (2013.01)

(58) Field of Classification Search
CPC ........ G06N 3/006; G06N 5/003; G06F 40/30; G06F 16/285; G06F 16/90332; G06F 16/3329; G06F 16/9024
See application file for complete search history.

(56) References Cited

U.S. PATENT DOCUMENTS

2016/0140425 A1* 5/2016 Kulkarni .............. G06K 9/6256
382/159

FOREIGN PATENT DOCUMENTS

CN 105184362 A 12/2015

OTHER PUBLICATIONS

Yang, "Linear Spatial Pyramid Matching Using Sparse Coding for Image Classification", (Year: 2009).*
Han, "Deep Compression: Compressing Deep Neural Networks With Pruning, Trained Quantization and Huffman Coding", 2016 (Year: 2016).*
Courbariaux, "BinaryConnect: Training Deep Neural Networks with binary weights during propagations", 2016 (Year: 2016).*
Wang, "Small-Footprint High-Performance Deep Neural Network-Based Speech Recognition Using Split-VQ", 2015 (Year: 2015).*
Gong, "Compressing Deep Convolutional Networks Using Vector Quantization", 2015 (Year: 2015).*
Chen, "Adaptive Blurring Estimation for Learning-Based Super Resolution", IEEE, 2015 (Year: 2015).*
Lane, "DeepX: A Software Accelerator for Low-Power Deep Learning Inference on Mobile Devices", IEEE, 2016 (Year: 2016).*

(Continued)

*Primary Examiner* — Ann J Lo
*Assistant Examiner* — Van C Mang
(74) *Attorney, Agent, or Firm* — Canon U.S.A., Inc. IP Division

(57) ABSTRACT

According to the present disclosure, a weight parameter of a neural network is divided into a plurality of portions having a certain size and approximation is individually performed on the portions using a weighted sum of the codebook vectors.

15 Claims, 12 Drawing Sheets

(56) References Cited

OTHER PUBLICATIONS

Shie "Transfer Representation Learning for Medical Image Analysis", IEEE, 2015 (Year: 2015).*
Hsieh, "Speech Feature Compensation Based on Pseudo Stereo Codebooks for Robust Speech Recognition in Additive Noise Environments" (Year: 2007).*
Qian Zhang, "Bilinear Vector Quantization", 2013 (Year: 2013).*
Emily Denton, et al., "Exploiting Linear Structure Within Convolutional Networks for Efficient Evaluation", Advances in Neural Information Processing Systems 27 (NIPS 2014), Jun. 9, 2014.
Jianchao Yang, et al., "Linear Spatial Pyramid Matching Using Sparse Coding for Image Classification", IEEE Conference on Computer Vision and Pattern Recognition, 2009.
Matthieu Courbariaux, et al., "BinaryConnect: Training Deep Neural Networks with binary weights during propagations", NIPS 2015.
Vadim Lebedev, et al.,Speeding-up Convolutional Neural Networks Using Fine-tuned CP-Decomposition, ICLR 2015,arXiv:1412.6553 [cs.CV], Apr. 24, 2015, 11 pages.

* cited by examiner

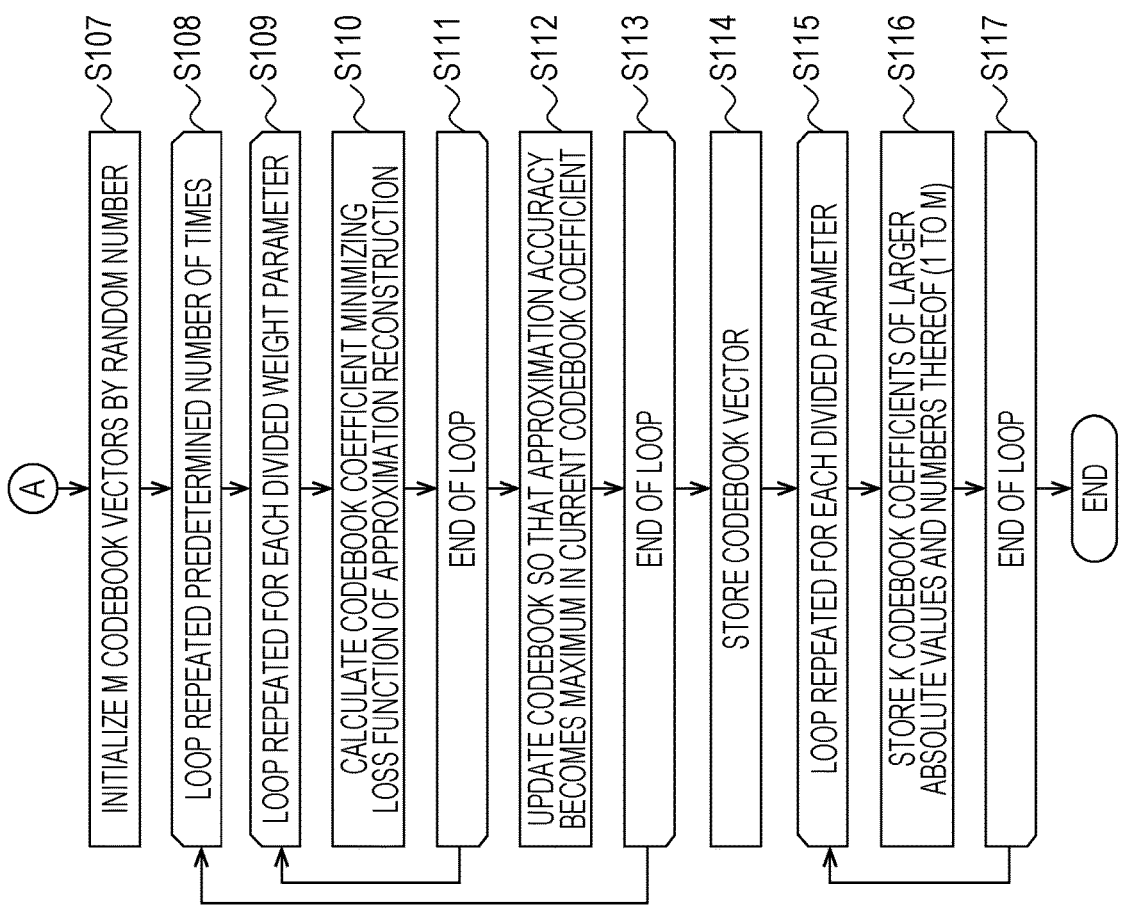
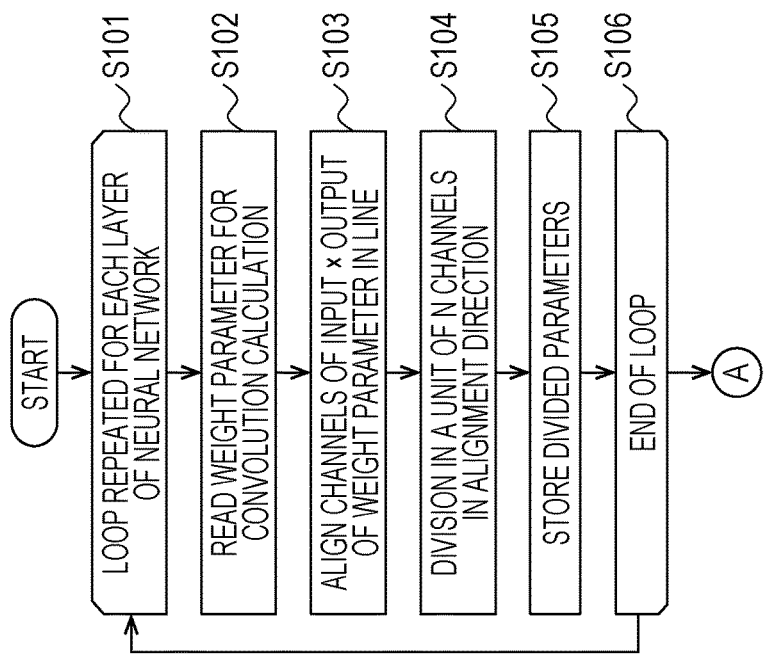

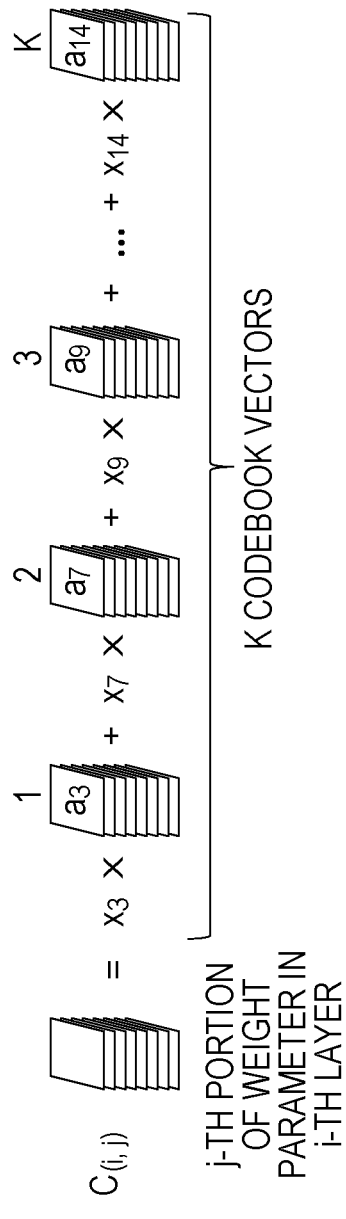
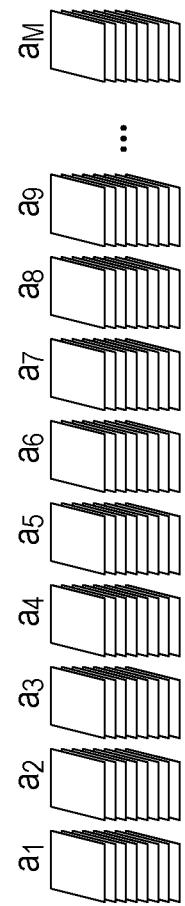
FIG. 4A
FIG. 4B
FIG. 4C

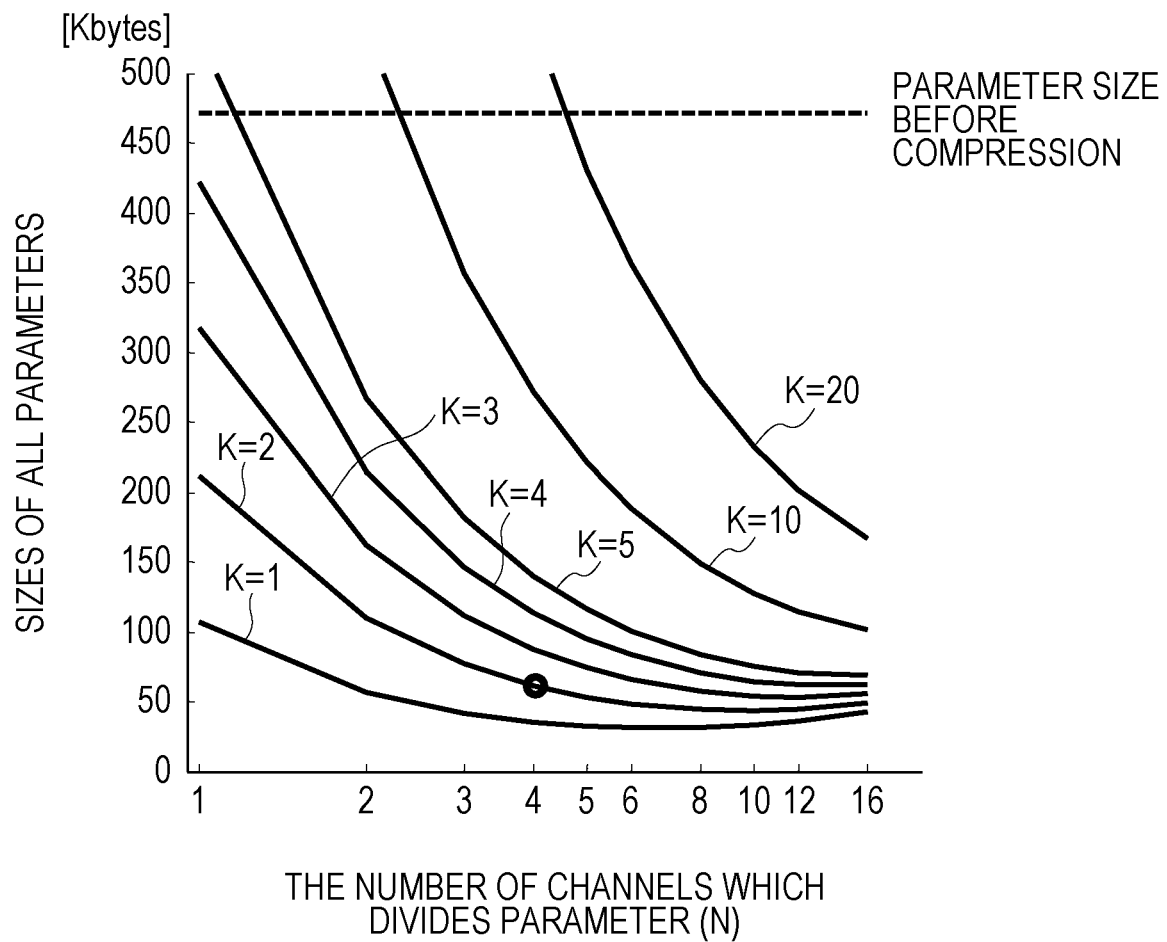

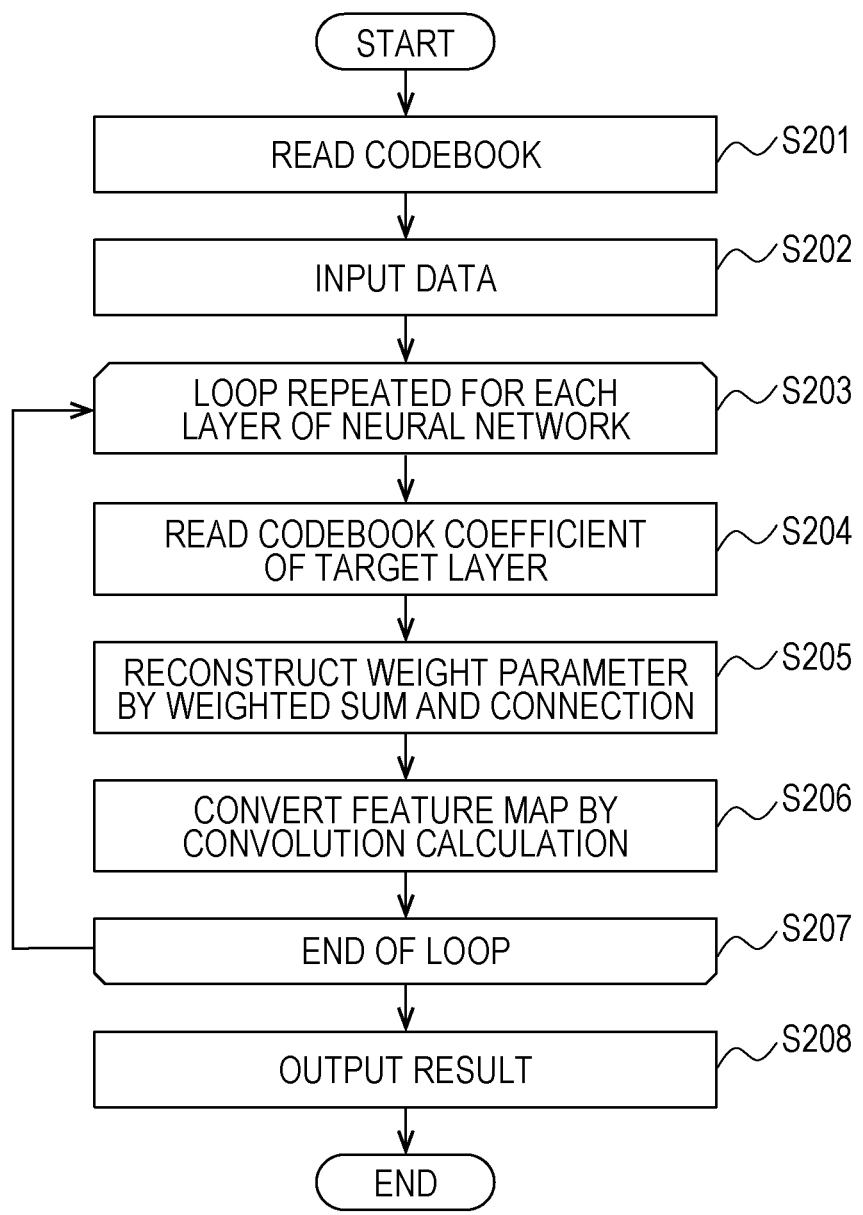

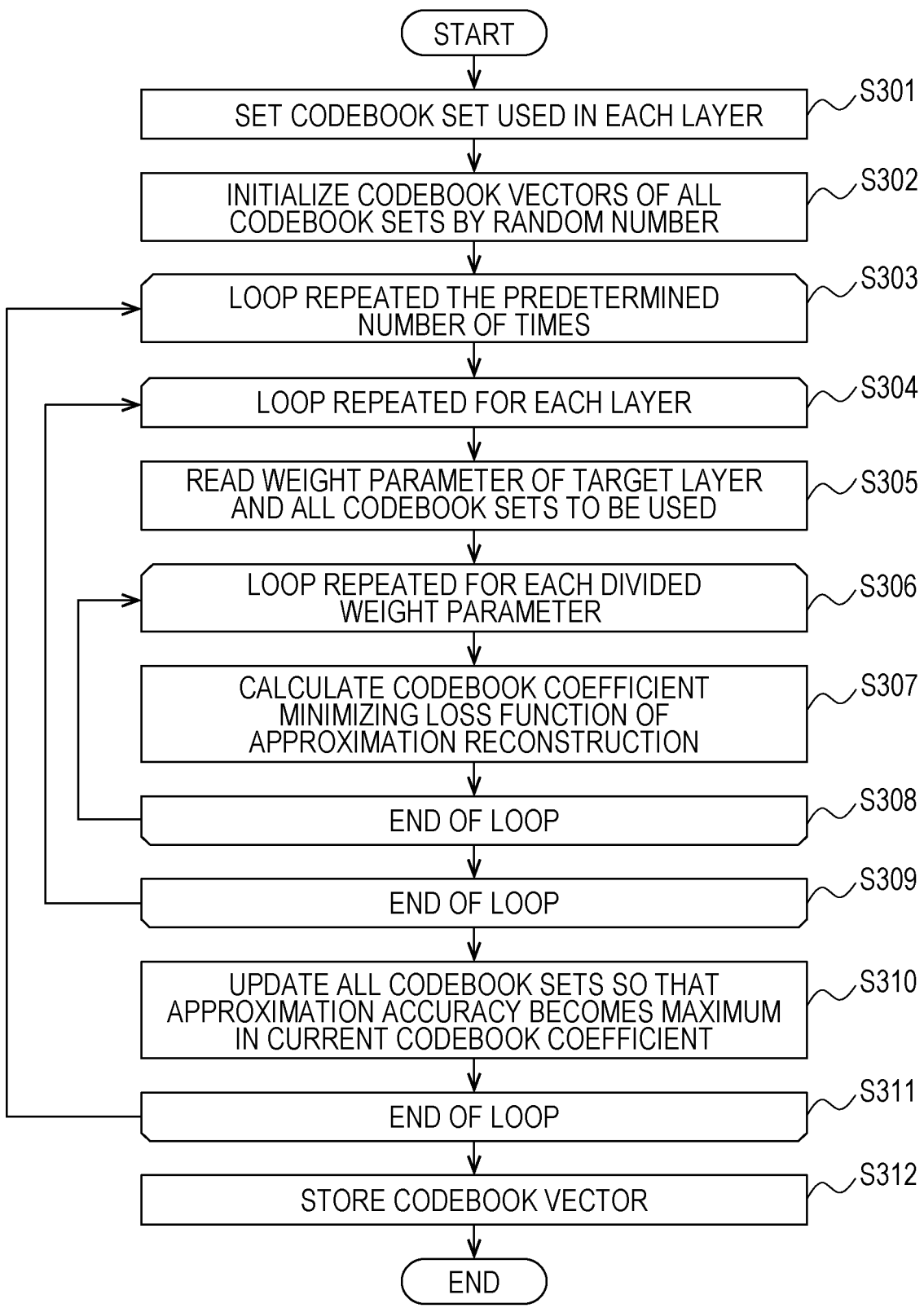

| NUMBER OF LAYER | FEATURE VALUE F: w×h×t×d | CONVOLUTION PARAMETER C: $w_c×h_c×t_c×d_i×d_{i+1}$ | NUMBER OF PARAMETERS BEFORE COMPRESSION | NUMBER OF TIMES KERNEL IS DIVIDED | NUMBER OF PARAMETERS AFTER COMPRESSION (K=4) (COMPRESSION RATE) |
|---|---|---|---|---|---|
| 1 | 400×300×4×3 | 3×3×3×3×24 | 1,944 | [3×3×8]×27 | 216 (11%) |
| 2 | 398×298×2×24 | 3×3×2×24×64 | 27,648 | [3×3×8]×384 | 3,072 (11%) |
| 3 | 396×296×1×64 | | | | |

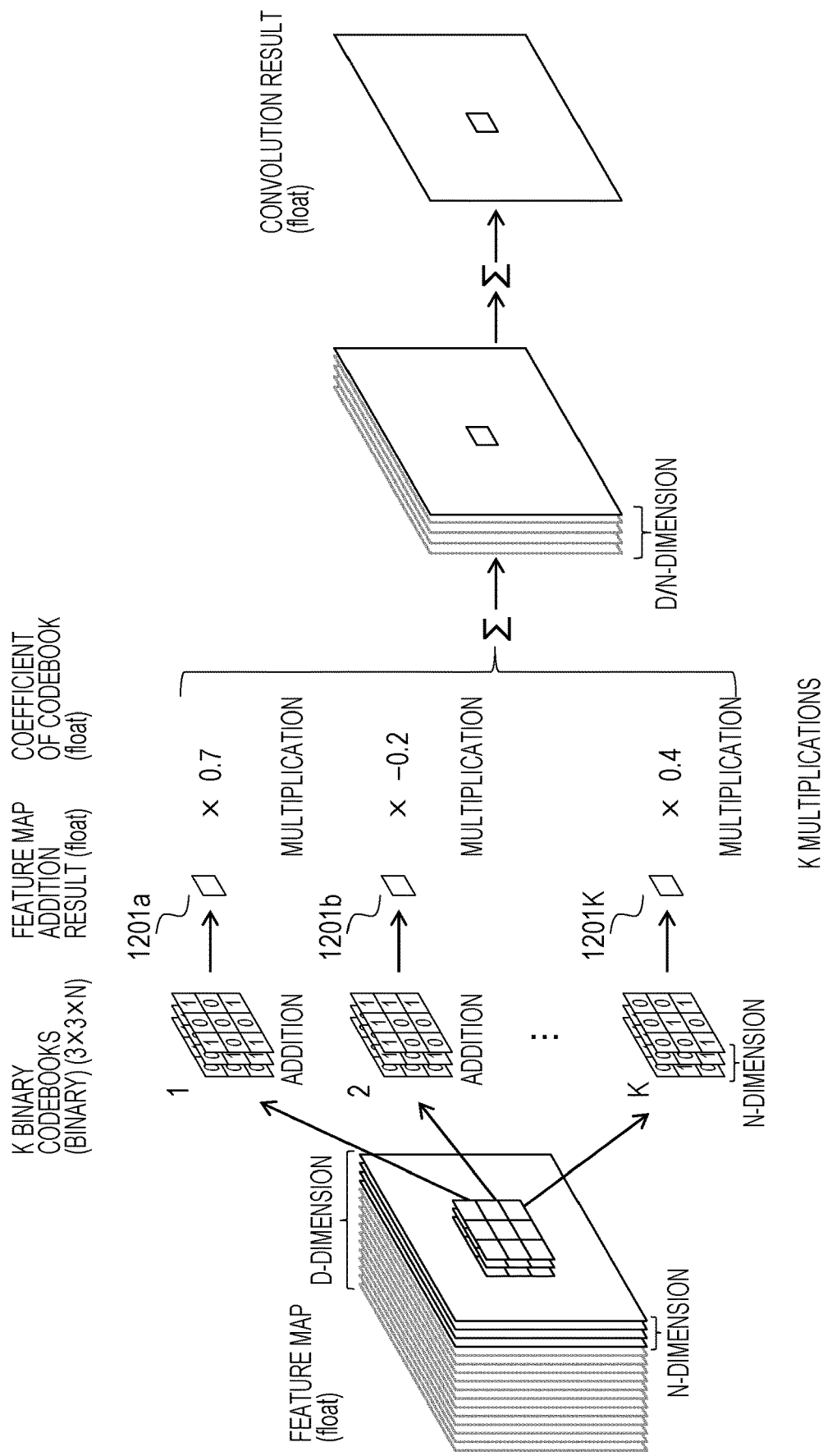

INFORMATION PROCESSING APPARATUS, INFORMATION PROCESSING METHOD, AND PROGRAM

BACKGROUND OF THE INVENTION

Field of the Invention

The present disclosure relates to a technique of learning a neural network.

Description of the Related Art

A neural network, in particular, a convolutional neural network (hereinafter referred to as a "CNN") which has been studied in recent years increases the number of parameters although the convolutional neural network has high recognition capability. Emily L. Denton, Wojciech Zaremba, Joan Bruna, Yann LeCun, and Rob Fergus, Exploiting Linear Structure Within Convolutional Networks for Efficient Evaluation, Advances in Neural Information Processing Systems 27 (NIPS 2014) discloses a method for reducing an amount of memory required for a recognition device.

According to the method disclosed in Emily L. Denton, Wojciech Zaremba, Joan Bruna, Yann LeCun, and Rob Fergus, Exploiting Linear Structure Within Convolutional Networks for Efficient Evaluation, Advances in Neural Information Processing Systems 27 (NIPS 2014), a weight parameter of a convolutional calculation of the CNN is represented by a direct product of vectors of three axes and a plurality of such direct products are added to one another so that approximation compression is performed (low rank approximation). However, it is likely that weight parameters in higher layers in the CNN in particular are sparse or inconsecutive, and therefore, it is difficult to improve accuracy when approximation using the direct product is used. Therefore, there is a need in the art for approximation with higher accuracy when compared with general methods relative to sparse weights, such as the weight parameters in the higher layers of the CNN.

SUMMARY OF THE INVENTION

According to an embodiment of the present invention, an information processing apparatus includes a division unit configured to divide a weight parameter of a neural network into a plurality of groups, and an encoding unit configured to approximate the weight parameter in accordance with a codebook and encode the weight parameter for individual divided groups.

Further features of the present invention will become apparent from the following description of exemplary embodiments with reference to the attached drawings.

BRIEF DESCRIPTION OF THE DRAWINGS

FIGS. 3A and 3B are a flowchart of a learning operation according to the first embodiment.

FIGS. 4A to 4C are diagrams schematically illustrating codebook approximation according to the first embodiment.

FIG. 5 is a graph illustrating a compression rate of the CNN obtained by a method different from that in the first embodiment.

FIG. 7 is a flowchart of a recognition operation according to the first embodiment.

FIG. 9 is a flowchart of a learning operation according to the second embodiment.

FIG. 12 is a diagram illustrating convolution calculation which does not employ a reconstruction of weights according to the fourth embodiment.

DESCRIPTION OF THE EMBODIMENTS

First Embodiment

Hereinafter, a first embodiment of the present disclosure will be described with reference to the accompanying drawings. In this embodiment, basic patterns of a method for compressing weight parameters of the neural network and a recognition operation using compressed parameters are described.

Figure 1:
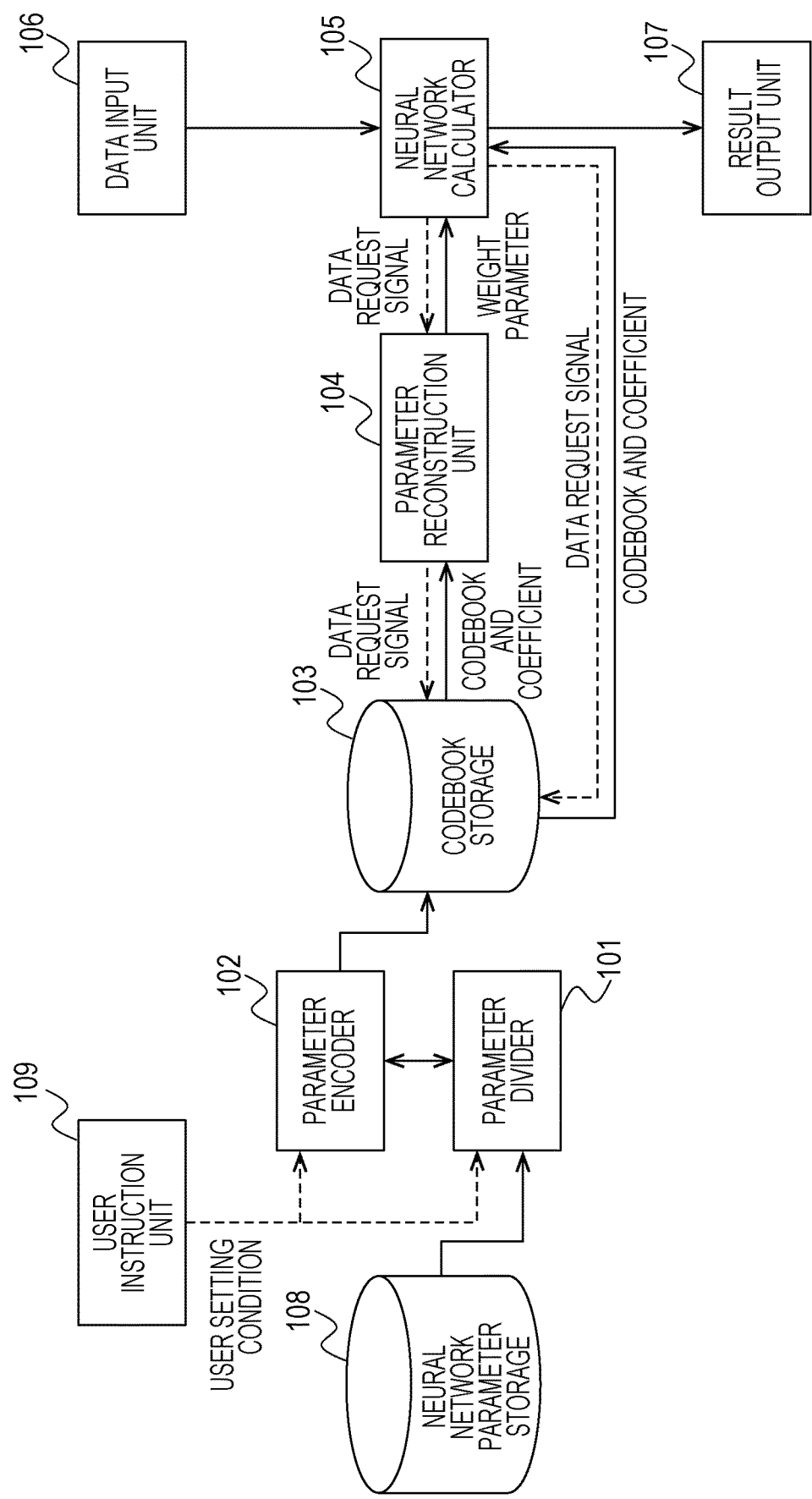
FIG. 1 is a block diagram illustrating a functional configuration of an information processing apparatus according to a first embodiment.

FIG. 1 is a diagram illustrating a functional configuration of an information processing apparatus according to this embodiment. The information processing apparatus includes a parameter division unit 101 which divides weight parameters of the neural network into parameters of a predetermined size and a parameter encoding unit 102 which performs codebook encoding on the individual divided parameters and which generates a codebook coefficient. The information processing apparatus further includes a codebook storage 103 which stores a codebook generated by the parameter encoding unit 102 and a codebook coefficient used for reconstruction of parameters. The information processing apparatus further includes a parameter reconstruction unit 104 which receives the codebook and the codebook coefficient and which performs approximate reconstruction on the weight parameters of the neural network and a neural network calculator 105 which receives the weight parameters and which performs calculation processes of the neural network.

The information processing apparatus further includes, as peripheral functions, a data input unit 106 which supplies data to be processed to the neural network and a result output unit 107 which outputs a result of a process performed in the neural network. The information processing apparatus further includes a neural network parameter storage 108 which stores parameters of the neural network before compression and which supplies the parameters to the parameter division unit 101 and a user instruction unit 109 which is used by a user to input various conditions when parameters are to be divided or encoded.

The information processing apparatus includes a hardware configuration including a central processing unit (CPU), a read only memory (ROM), a random access memory (RAM), and a hard disk drive (HDD), and various functional configurations and processes in flowcharts described below are realized when the CPU executes programs stored in the ROM or a hard disk (HD), for example. The RAM includes a storage region functioning as a work area used by the CPU developing and executing the programs. The ROM includes a storage region which stores the programs to be executed by the CPU. The HD includes a storage region which stores various programs and various data including data on parameters to be used when the CPU executes processes.

Figure 2A:
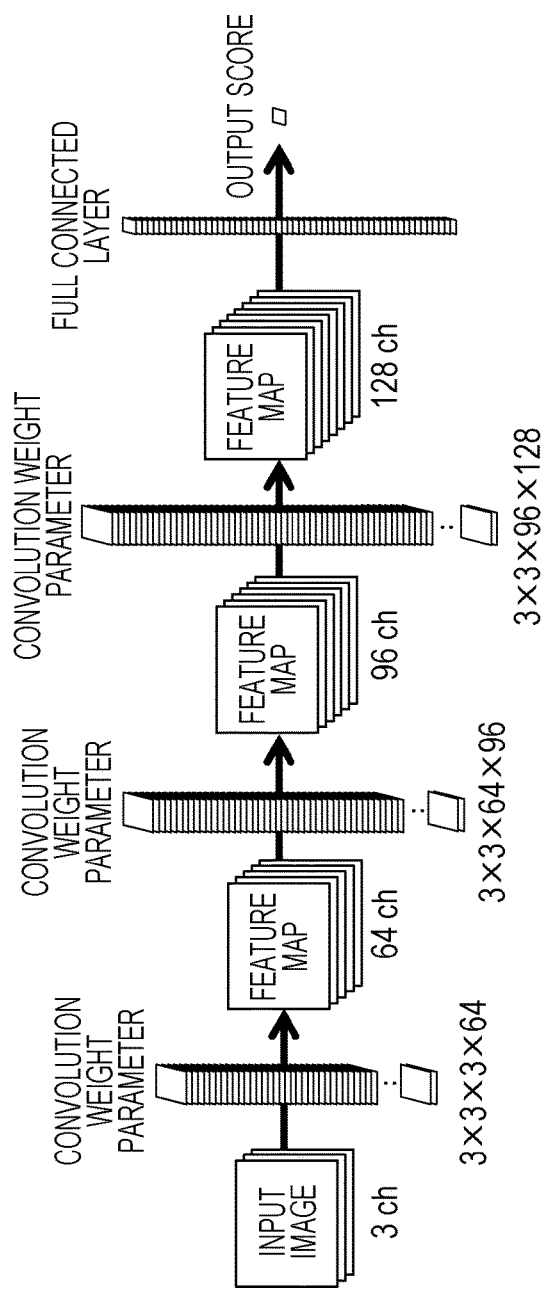
FIGS. 2A to 2C are diagrams schematically illustrating approximation compression according to the first embodiment.

Note that the information processing apparatus of the present disclosure may process various data, such as audio, images, and text. However, input data in this embodiment is a still image of colors of three channels (hereinafter the term "channel" is abbreviated as "ch") as schematically illustrated in FIG. 2A. Furthermore, it is assumed that the neural network of this embodiment is a multiple-layer CNN and the weight parameters have been learnt.

Figure 2B:
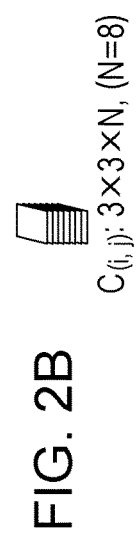
Figure 2C:
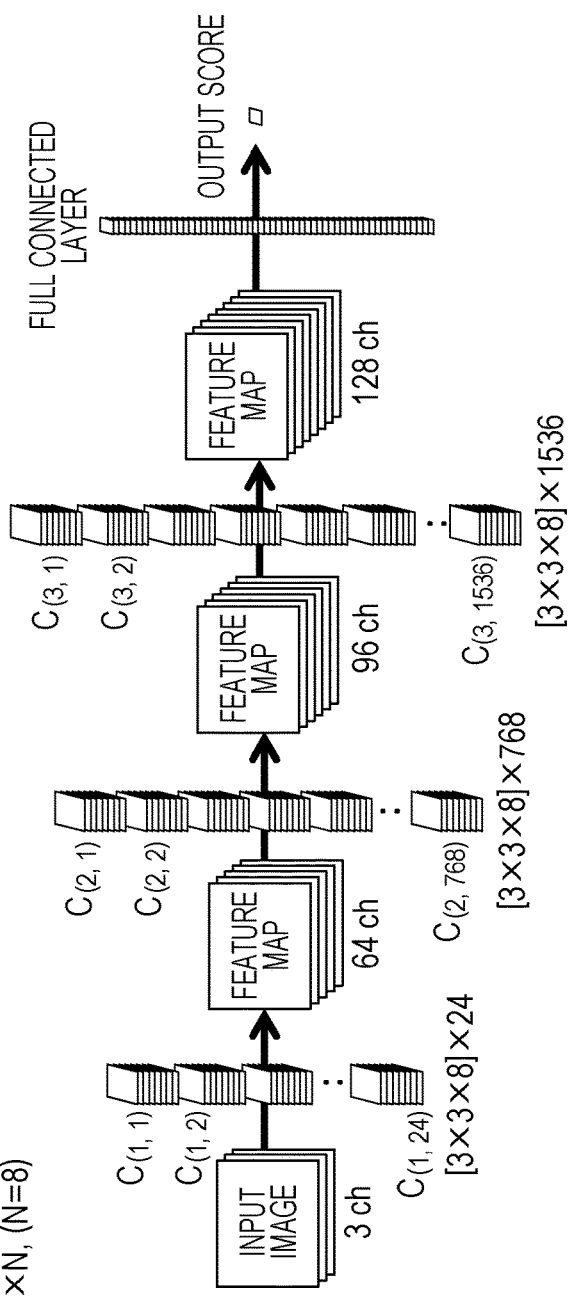

FIGS. 2A to 2C are diagrams illustrating approximation compression. When the CNN starts operation, feature maps of 64 ch, 96 ch, and 128 ch are successively obtained in an intermediate layer by convolution calculations performed in individual layers, and finally, a result is output after a process of a full connected layer is performed. Here, a final layer outputs 1 ch. Note that the CNN includes a calculation process which is a so-called activating function and maximum-value pool in addition to the convolution calculation and the calculation of the full connected layer. However, the calculation process is not associated with the essence of this embodiment, and therefore, is omitted in FIGS. 2A to 2C. A configuration of the CNN is generally known in various documents including Emily L. Denton, Wojciech Zaremba, Joan Bruna, Yann LeCun, and Rob Fergus, Exploiting Linear Structure Within Convolutional Networks for Efficient Evaluation, Advances in Neural Information Processing Systems 27 (NIPS 2014), and therefore, a detailed description thereof is omitted. Note that, although each of the layers of the CNN may further include weight parameters which are called as "bias terms", the bias terms and the parameters of the full connected layer are not compressed but original values are maintained. However, they may be collectively compressed in a method described below.

Operation in Learning of Approximation Compression

Next, an operation of approximately compressing parameters of the neural network performed by the information processing apparatus will be described in detail with reference to a flowchart of FIGS. 3A and 3B. When an operation is started, first, the parameter division unit 101 performs a loop process from step S101 to step S106. When the loop is started in step S101, all weight parameters in individual layers are read as a preparation step of the compression and a process of dividing the parameters into portions having the same size. In step S102, the parameter division unit 101 sequentially reads parameters of the convolution calculation in the individual layers from the neural network parameter storage 108. In step S103, the parameter division unit 101 aligns the weight parameters so as to divide the parameters into portions having the same size.

Hereinafter, a process of the alignment will be described in detail. The parameters of the convolution calculation of the CNN may be generally represented by four-dimensional tensor. A size of the tensor is denoted by "$W \times H \times D_{IN} \times D_{OUT}$". Here, "W" and "H" denote a vertical pixel size and a horizontal pixel size for convolution, and "$D_{IN}$" and "$D_{OUT}$" indicate the number of feature channels of input data and the number of feature channels of output data which is output as a result of the convolution.

When a first layer of the neural network of FIG. 2A is taken as an example, a size of a convolution parameter in a space direction is 3×3, and an input RGB image has three channels, and an output size is 64 ch. In this embodiment, a calculation operation f which converts this parameter into a three dimensional parameter and which is represented by Expression 1 is used.

$$f: R^{W \times H \times D_{IN} \times D_{OUT}} \rightarrow R_{W \times H \times D'} \quad \text{Expression 1}$$

Note that the following equation is satisfied: $D' = D_{IN} \times D_{OUT}$". As a concrete example of the calculation operation f, a calculation operation represented by Expression 2 below is taken as an example.

$$C'[i,j,p+(q-1) \times D_{IN}] := c[i,j,p,q] \quad \text{Expression 2}$$

Note that the following equations are satisfied.

$$p=1, \ldots, D_{IN}$$

$$q=1, \ldots, D_{OUT}$$

$$c' \in R^{W \times H \times D'}, c \in R^{W \times H \times D_{IN} \times D_{OUT}}$$

The calculation operations described above are performed to align a parameter in raster order. According to this calculation operation, a tensor having the size of 3×3×3×64 in the first layer is converted into a three dimensional tensor having a size of 3×3×192.

In step S104, the parameter division unit 101 divides the parameter aligned in the preceding step into a plurality of partial parameters. It is assumed here that a parameter having a size of 3×3×192 is divided into partial parameters having a size of 3×3×N as illustrated in FIG. 2B. In an example of FIG. 2B, N is 8. It is preferable that N is a divisor of a product "$D_{IN} \times D_{OUT}$" of an input ch and an output ch. Note that "N" may be an arbitrary integer when a method described below is employed.

As a result of the division, the weight parameters of the individual layers are divided into partial parameters $c_{(i, j)}$ having the same size as illustrated in FIG. 2C. Here, $c_{(i, j)}$ indicates a parameter in a j-th portion obtained by dividing a weight parameter in an i-th layer. Note that, although the weight parameter in the first layer has 3 input channels which is smaller than the number N of unit elements of the division (N=8), the weight parameter in the first layer may be easily divided similarly to other layers by performing an alignment operation in advance as a characteristic configuration of this embodiment.

Next, the parameter divided in a unit of element is subjected to the approximation compression by a codebook which is independently provided. This process will be described in detail with reference to the flowchart of FIG. 3B and diagrams of FIGS. 4A to 4C schematically illustrating codebook approximation according to this embodiment. First, the codebook includes M codebook vectors having a size the same as a unit of elements divided as illustrated in FIG. 4C. In this embodiment, a method which is called sparse coding is used for the approximation of the divided weight parameters. The sparse coding is one of methods for approximating data by a linear sum of bases of the codebook vectors as illustrated in FIG. 4A. As illustrated in FIGS. 4A and 4B, data c is approximated by k linear sums $\Sigma_m x_{(i,j,m)} \times a_m$ of the codebook vectors $a_m$. Here, $m \in \{top(K)\}$ means numbers of top K coefficients having in terms of absolute values in codebook coefficients x(i, j, 1) to x(i, j, M). Here, in a case where repetition of a specific pattern is included in data c or in a case where the specific pattern is sparse, the sparse coding method is capable of performing approximation with high accuracy using a comparatively smaller number of codebook vectors when compared with other methods.

The codebook vectors and the codebook coefficients are learnt by minimizing a loss function as illustrated in Expression 3 below.

$$\min_{x, A} \Sigma_n \|c_n - Ax_n\|^2 + \lambda |x_n|,$$

Subject to $\|a_n\| \le 1 \forall n = 1, 2, \ldots, M$  Expression 3

Here, "$c_n$" denotes n-th one of the divided weight parameters, $c_{i,j} \in R^{W \times H \times D}$ which is three-dimensional data is aligned as a column vector having a length L (W×H×D) so as to obtain $c_n \in R^{L \times 1}$. A is a set of M codebook vectors $a_i$ and is represented as follows: $A = [a_1, a_2, \ldots, a_M]$. The codebook vectors $a_i$ correspond to $a_i \in R^{L \times 1}$. $X_n$ is a coefficient of a codebook used for reconstruction of an n-th weight parameter and corresponds to $x_n \in R^{M \times 1}$.

A first term of a formula in a first row in Expression 3 is a loss term of an approximation error, and a second term is a loss term referred to as a "sparse term". "$\lambda$" indicates a hyper parameter which adjusts the two terms. A formula in a second row indicates a constraint condition for eliminating apparent trivial solutions. When learning calculations are performed, minimization of x and minimization of A in Expression 3 are alternately performed until convergence is reached or a predetermined number of times is reached (step S108 to step S113). The second term in the first row is a cost term of L1 norm, and therefore, a large number of values of codebook coefficients $x_n$ are converged to 0, that is, the codebook coefficient $x_n$ are sparse. Therefore, approximation reconstruction of a weight parameter $c_n$ is enabled only using k codebook coefficients which have large absolute values among the codebook coefficients $x_n$. The sparse coding is general technique as illustrated in J. Yang, K. Yu, Y. Gong, and T. Huang, Linear Spatial Pyramid Matching Using Sparse Coding for Image Classification, IEEE Conference on Computer Vision and Pattern Recognition, 2009, and therefore, a more detailed description is omitted.

In this way, the weight parameters of the convolution of the layers are approximated using the codebook A including M codebook vectors and the codebook coefficients X for reconstruction. The codebook storage 103 stores the codebook A and the codebook coefficient X obtained in step S114 to step S117, and thereafter, the approximation compression operation is terminated.

Note that a compression rate is changed depending on the number M of codebooks which are hyper parameters and the number K of codebook coefficients to be used for the reconstruction. For example, a compression rate obtained when a general CNN which is referred to as "AlexNet" is compressed is illustrated in FIG. 5. It is assumed that the number M of codebooks is 256, and the codebook coefficients and the parameters have a size of 8 bits for one element. Here, when K is 2 and N is 4, compression into 1/7 or less of an original size is performed (a position denoted by a dot in FIG. 5).

Recognition Operation

FIG. 7 is a flowchart of a recognition operation according to this embodiment. When the operation of the neural network is started, a parameter reconstruction unit 104 reads the codebook A and the codebook coefficient X from the codebook storage 103. Subsequently, when a process is performed on an i-th layer, connection is performed after the parameter reconstruction unit 104 reconstructs a parameter $c_{(i,j)}$ by a linear sum using a corresponding codebook vector and a corresponding codebook coefficient as illustrated in Expression 4 below. In this way, the convolution parameter is restored (step S203 to step S205).

$$c_{(i,j)} = \Sigma_{m \in \{Top(K)\}} x_{(i,j,m)} a_m$$  Expression 4

Thereafter, a processing operation of the neural network using the convolution process is performed similarly to the general CNNs (step S206). In this way, the recognition operation according to this embodiment is performed.

According to this embodiment, a weight parameter of the neural network is divided into a plurality of portions (groups) having the same size and approximation is individually performed on the portions using a weighted sum of the codebook vectors. Accordingly, as with weight parameters in higher layers of the CNN, approximation may be performed with high accuracy on sparse weights.

Modifications

Furthermore, various embodiments may be employed as parameter alignment and parameter division in addition to the embodiment described above. For example, after a parameter is aligned in a size of 9×3×64, the parameter is divided into a size of 9×3×4, or after a parameter is aligned in a two-dimensional manner in a size of 27×64, the parameter is divided into a size of 3×64. This embodiment is not limited to specific embodiment. However, since the convolution is performed for individual channels in the recognition operation of the CNN, it is preferable, in terms of a speed of implementation, that a dimension of a target of the division is not in a convolution space direction but in a direction of a dimension of input/output channels as described above.

Furthermore, although the full connected layer and the bias term are not to be compressed in the foregoing description, they may be included in targets of the compression. For example, although a weight parameter of the full connected layer is an array in a size of $D_i \times D_{i+1}$, the weight parameter may be aligned to be shaped as a three-dimensional parameters in a size of $3 \times 3 \times [D_i \times D_{i+1}/9]$. As an alignment method, raster order may be employed, that is, any order may be employed as long as the order is a certain method having reproducibility. If the weight parameter is subjected to the shaping operation, the parameter may be easily divided by an element unit of 3×3×N. Note that, if a value obtained from "$D_i \times D_{i+1}/9$" is indivisible or if a remainder is obtained in division performed for N channels, the remainder is not compressed but a value of the original parameter is stored. Alternatively, a dummy value, such as 0, may be added to the parameter so that a divisible size is obtained. Note that the dummy value is removed after parameter reconstruction in the recognition operation. Furthermore, in the recognition, only in the full connected layer, the calculation process of the neuron network is required to be performed after the general reconstruction of a weight parameter is performed and the parameter is aligned again in an array of portions having a size of $D_i \times D_{i+1}$. The bias value may be compressed by the same method.

Furthermore, codebook approximation compression of a neural network other than the CNN may be taken as another modification. In this case, weight parameters of all layers are two-dimensional parameters in a size of $D_i \times D_{i+1}$. In this case, the parameters in the size of $D_i \times D_{i+1}$ may be aligned in the size of $[W] \times [D_i \times D_{i+1}/W]$ so as to have a predetermined size W. Note that each square bracket correspond to one dimension of a parameter. The parameters are aligned in raster order. Thereafter, each of the parameters is divided in an element unit of W×N channel, and obtained parameters are approximated by a codebook. Note that, as with the case described above, in the indivisible case, a dummy value is added.

Furthermore, as a further modification, a case where a convolution layer other than a convolution layer having a pixel size of a convolution calculation of 3×3, that is, a convolution layer having a size of 5×5 or 7×7, is mixed is taken as an example. In this case, a codebook may be provided for each size, and encoding learning may be individually performed.

Note that, as a learning method using a codebook, a method for approximating the leant weight parameters of the neural network using a codebook is described above. However, various modifications of the approximation method may be made as described below, and methods in the modifications affect final capability. Hereinafter, a modification of the learning operation will be described.

First Modification of Learning Operation

As a first modification, a method for gradually approximating parameters in individual layers from a lower layer instead of a method for performing approximation compression on all the layers at once will be described. A procedure will be described in detail hereinafter. First, codebooks and codebook coefficients are leant so that weight parameters in all the layers of a neural network are to be approximated. Thereafter, only a parameter in a first layer of the neural network is replaced by a value which has been approximated and reconstructed by the codebook.

Subsequently, learning data is supplied to the neural network, and weights in a second layer onwards are learnt again using an error backpropagation method. This process is performed on the individual layers from a lowest layer to a highest layer. As the method described above, a risk that when all the layers are individually subjected to approximation compression, approximation errors are stacked in upper layers is high. However, the errors may be reduced if the approximation is performed on the layers one by one.

Second Modification of Learning Operation

As a second modification, an embodiment in which learning of a codebook is performed simultaneously with learning of the neural network will be described. In the second modification, first, a codebook A and a codebook coefficient X are initialized by a random number, and a weight w of the neural network is converted into an approximation formula w: $=\Sigma_m A x_m$ in advance. Then the codebook coefficient X is updated using a stochastic error backpropagation method. Formulae in Expression 5 below are used for the update.

$$E = E_{NN} + \lambda |x| \quad \text{Expression 5}$$

$$\Delta x_m = -\eta \frac{\partial E}{\partial x_m}$$

$$= -\eta \left(\frac{\partial E}{\partial w}\right) \times \left(\frac{\partial w}{\partial x_m}\right)$$

$$= -\eta \left\{\left(\frac{\partial E_{NN}}{\partial w}\right) \times A + \lambda \times \text{Sign}(x_m)\right\}$$

Note that "$E_{NN}$" indicates an error amount relative to a target value at the time of learning of the neural network. "$\eta$" indicates a learning coefficient. "E" indicates an error amount obtained by adding an error of the neural network to a loss of a spares term. "Sign(x)" indicates an operator for returning x. "$\partial E/\partial w$" indicates a gradient of an error and may be obtained by the general error backpropagation method.

Furthermore, a variable A of the codebook is updated by the stochastic error backpropagation method in accordance with Expression 6.

$$\Delta a_m = -\varepsilon \frac{\partial E_{NN}}{\partial a_m} \quad \text{Expression 6}$$

-continued $$= -\varepsilon \left(\frac{\partial E_{NN}}{\partial w}\right) \times \left(\frac{\partial w}{\partial a_m}\right)$$

$$= -\varepsilon \left(\frac{\partial E_{NN}}{\partial w}\right) \times x_m$$

Note that "$\epsilon$" indicates a learning coefficient. By alternately performing update by the method described above, learning of the neural network, the codebook, and the codebook coefficient may be simultaneously performed.

Third Modification of Learning Operation

As a third modification, an embodiment in which change and learning of order of channels are performed so that weights of the neural network match an existing learnt codebook is taken as an example. Although a weight parameter of the CNN may be aligned in raster order, a process of changing order of channels is not performed. In the CNN, the order of the channels in the individual layers is not important, and therefore, change of order of the channels does not affect the learning as long as consistency of the parameters is maintained among the layers. Therefore, in the third modification, the weight parameters of the CNN are sorted so as to be suitable for the leant codebook.

Figure 6A:
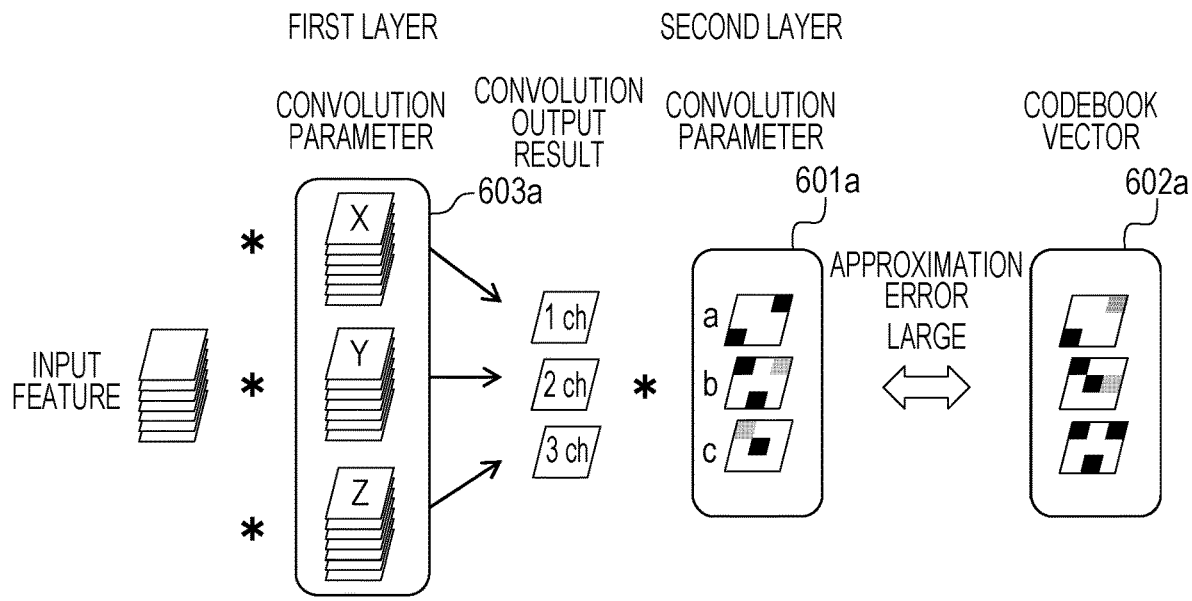
FIGS. 6A and 6B are diagrams illustrating a modification of the learning operation according to the first embodiment.
Figure 6B:
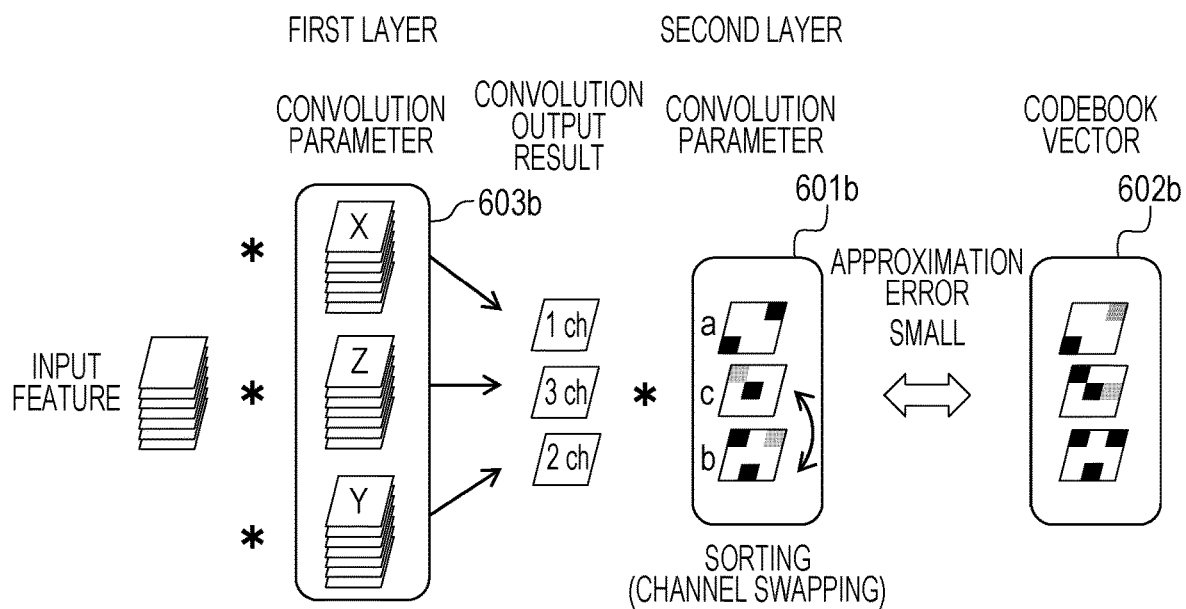

Specifically, it is assumed that, as illustrated in FIG. 6A, a codebook vector 602a is used in approximation of a convolution parameter 601a which is a target of approximation compression. In this case, as illustrated in FIG. 6B, an approximation error may be reduced when the order of the channels is changed. However, in this case, order of a convolution parameter 603a in a first layer is also required to be changed to a parameter 603b.

Making use of the characteristic described above, a sorting method described below may be employed, for example. First, a pair of a convolution parameter and a codebook vector which has lowest approximation accuracy is determined in approximation performed using the temporary codebook. Subsequently, a feature channel layer having lowest approximation accuracy is determined in the parameter. Thereafter, this channel layer is randomly swapped by another channel in the same layer, and as a result, if entire approximation accuracy is improved, the swapping is adopted.

The learning method for sorting the weights of the CNN relative to a codebook coefficient is described above. However, in terms of learning of the CNN in accordance with an existing codebook, various methods may be employed, and this embodiment is not limited to the method described herein.

Fourth Modification of Learning Operation

In a fourth modification, a user sets a constraint condition of parameters using a user instruction unit 109, and learning is optimized within the constraint condition. For example, the fourth modification corresponds to the following method. That is, a maximum value of a memory size or the like is input, and the parameter encoding unit 102 searches for hyper parameters K and N so that a size after compression does not exceed a condition value. Examples of the method include a method for changing values of the parameters in a certain interval in learning and employing change of the parameter having a largest value of an evaluation formula as represented by Expression 7 and which satisfies the constraint condition.

Evaluation Value=Size Increasing Rate after Compression×Reduction Rate of Approximation
Error           Expression 7

Second Embodiment

Next, a second embodiment of the present disclosure will be described. In the first embodiment, the weight parameters are compressed using the codebook which is common in all the layers. On the other hand, in this embodiment, a method for reading and using a set of different codebooks at different timings in different layers so that a memory amount of an information processing apparatus is compressed will be described. Note that descriptions of components which are the same as those of the first embodiment are omitted.

Figure 8:
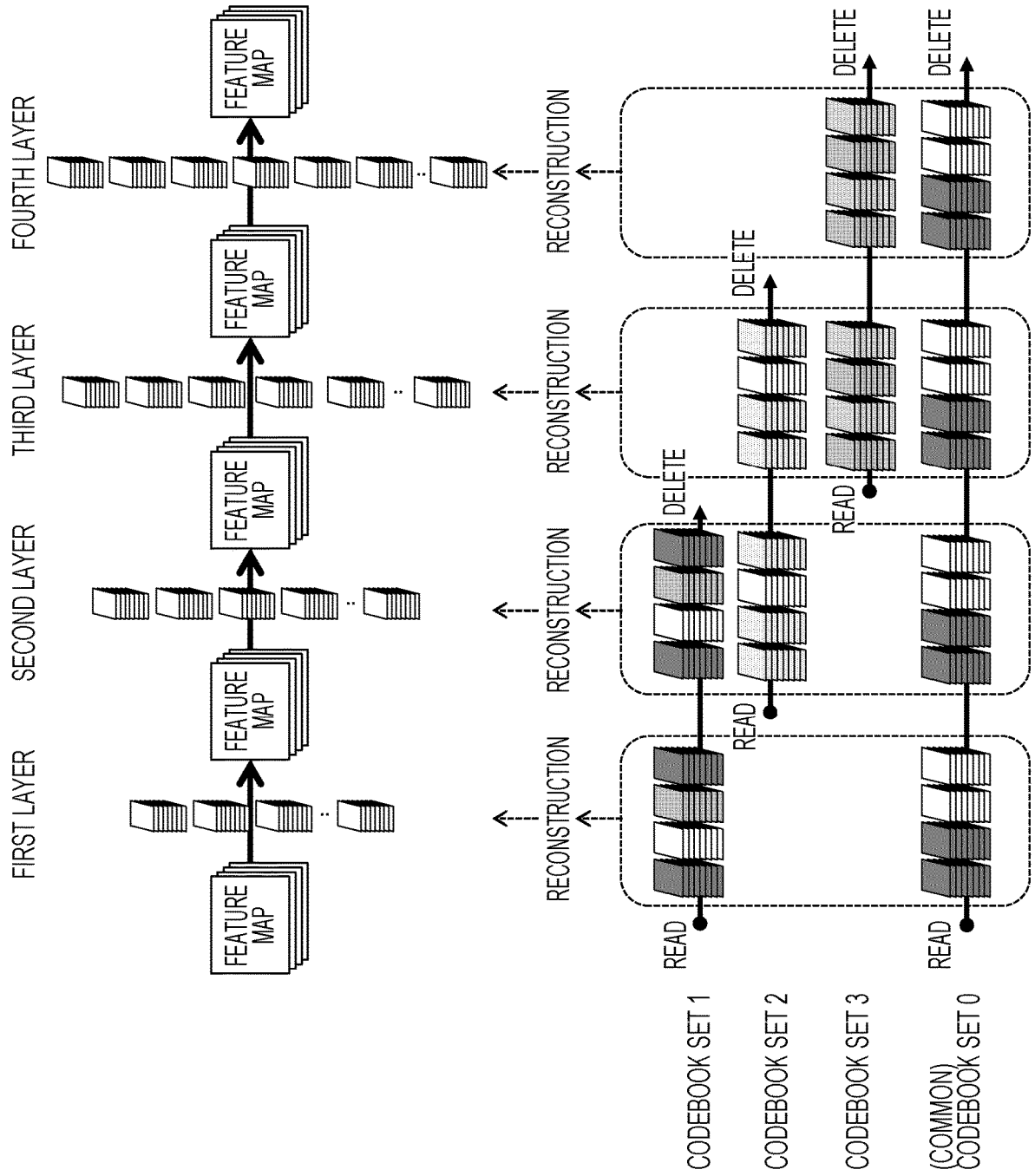
FIG. 8 is a diagram schematically illustrating approximation compression according to a second embodiment.

FIG. 8 is a diagram schematically illustrating approximation compression according to this embodiment. In this embodiment, as illustrated in FIG. 8, in addition to a codebook set 0 which is common in all layers, a codebook set 1 is read and used in first and second layers, a codebook set 2 is read and used in the second layer and a third layer, and a codebook set 3 is read and used in the third layer and a fourth layer. Furthermore, a codebook set which is no longer used is appropriately removed from the memory so that an amount of use memory is suppressed to a fixed value.

Lower layers of the CNN are likely to have weight distribution like a Gabor filter, and higher layers are likely to have parameters having sparse weights including a large number of zero values. Therefore, different codebooks are used in a lower layer, a middle layer, and a higher layer which are loosely divided so that the approximation accuracy may be improved without increasing the amount of use memory. Note that, when different codebooks are used in different layers, the codebooks and codebook coefficients are learnt in individual layers at the time of learning of the codebooks.

On the other hand, as illustrated in FIG. 8, if a plurality of codebook sets are to be used at an overlapped timing, a learning process described below is performed, for example. FIG. 9 is a flowchart of the learning operation according to the second embodiment, and learning is performed in accordance with this flowchart in this embodiment. This learning process is obtained by modifying the process from step S107 to step S113 of the first embodiment illustrated in FIG. 3B.

In a processing flow of this embodiment, first, sizes of codebook sets corresponding to the individual layers are set in step S301. This setting is performed by assigning predetermined values in advance or by causing the user to input values using the user instruction unit 109. In step S302, the parameter encoding unit 102 initializes all the codebook sets and values of codebook coefficients using a random number. Subsequently, in step S304 to step S309, learning update is successively performed on the codebook coefficients of the individual layers. Specifically, first, the parameter encoding unit 102 reads a weight parameter of a target layer and all codebook sets to be used (step S305). It is assumed here that the weight parameter has been divided.

Thereafter, the parameter encoding unit 102 updates the codebook coefficients in accordance with Expression 3 so that the weight parameter of the layer is approximated (step S307). In this case, only a codebook vector included in the codebook set used in this layer is used in the approximation. In this way, the learning update is performed on the individual layers. When the update on all the layers is terminated by one iteration, values of codebook vectors of all the codebook sets are updated in accordance with Expression 3 (step S310). By repeatedly performing the process described above a certain number of times, the plurality of codebook sets to be used in an overlapped timing are appropriately learnt. With this configuration, different codebook sets may be read and used at different timings in the individual layers.

Although a codebook set for a plurality of layers has been described in the foregoing description, the different layers may independently have different codebook sets and the codebook sets may be read every time before calculation is performed in the layers. As described above, this embodiment relates to holding and reading timings of the codebook sets and is not limited to a specific embodiment.

Third Embodiment

Next, a third embodiment of the present invention will be described. In the first and second embodiments, the weight parameters of the CNN are subjected to the approximation and compression for image data. However, this embodiment is further generalized and is applicable to a CNN which processes higher dimensional data. Examples of the higher dimensional data include data on depth information, voxel images to be used in medical image diagnosis, and moving images. In a description below, an embodiment of the approximation compression on parameters of the CNN which process a moving image data, for example, will be described. Note that descriptions of components the same as those of the first and second embodiments are omitted.

Figures 10A, 10B:
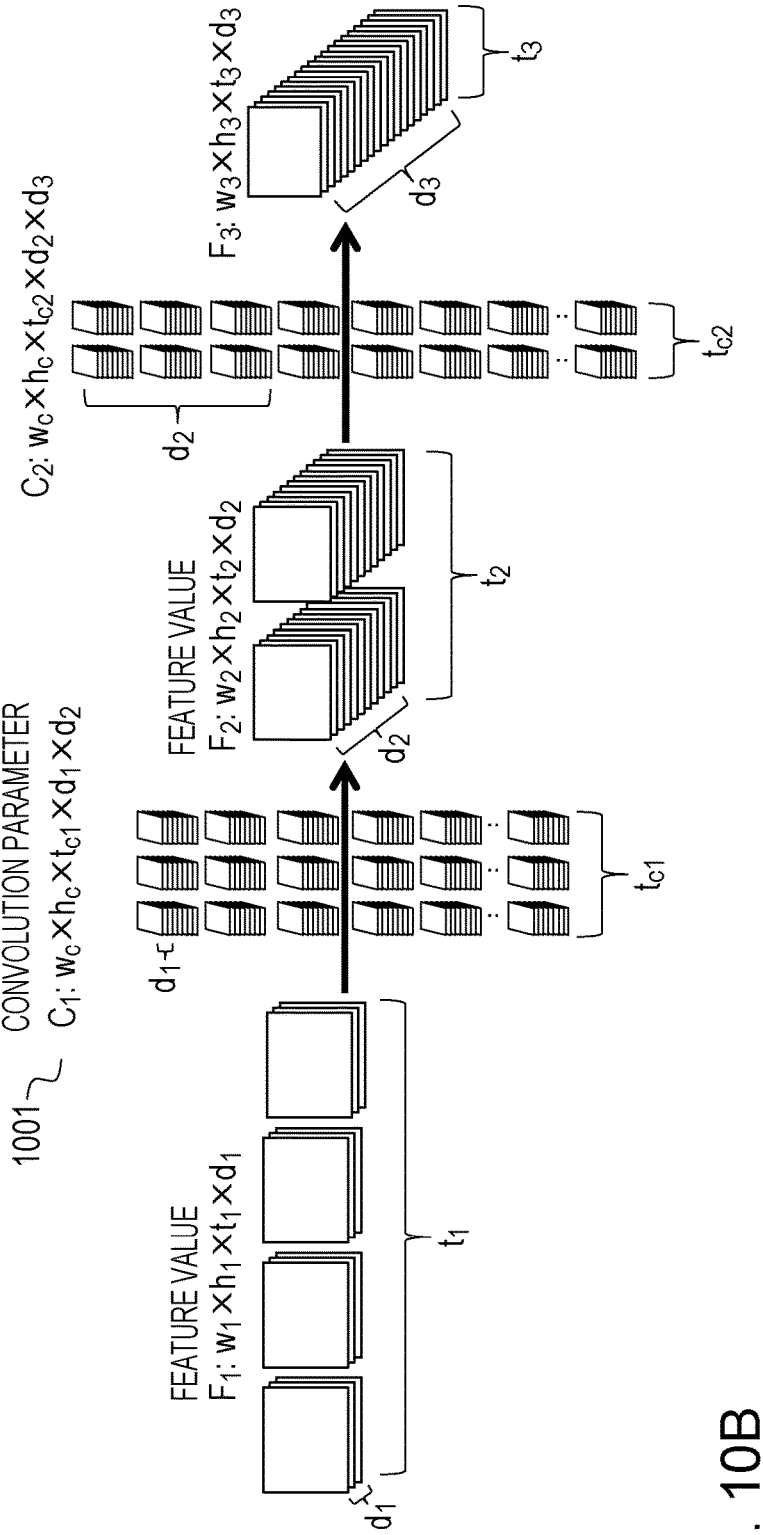
FIGS. 10A and 10B are diagrams schematically illustrating approximation compression according to a third embodiment.

FIGS. 10A and 10B are diagrams schematically illustrating approximation compression according to the third embodiment. As illustrated in FIG. 10A, a parameter 1001 for convolution on time-series information is five-dimensional tensor and has a size of $w_c \times h_c \times t_{c1} \times d_1 \times d_2$. In this way, although the data is high dimensional data, as with the first embodiment, the data is aligned in predetermined raster order, the data is divided into weight parameters having a size $w_c \times h_c \times N$, and the divided portions are approximated using a codebook so that the approximation compression is performed. For example, in a case of a first layer, assuming that a size of a convolution parameter is "3×3×3×3×24", when the parameter is divided by a unit element of a size of 3×3×8, 27 unit elements are obtained. As a reference, compression of a parameter of the CNN under a certain setting condition is illustrated in FIG. 10B. With this setting value, a compression rate of approximately 11% is attained according to FIG. 10B.

As described above, according to this embodiment, the approximation compression may be performed on data on depth information, voxel images, moving images, or the like, with high accuracy.

Fourth Embodiment

Next, a fourth embodiment of the present invention will be described. Although the codebook vectors of the parameters are real numbers in the foregoing embodiments, the vectors are binary in this embodiment. Since the codebook vector is binarized in this embodiment, accuracy of approximation may be lowered. However, reduction of a memory size or reduction of a calculation load amount may be expected. Note that descriptions of components the same as those of the first to third embodiments are omitted.

Figure 11:
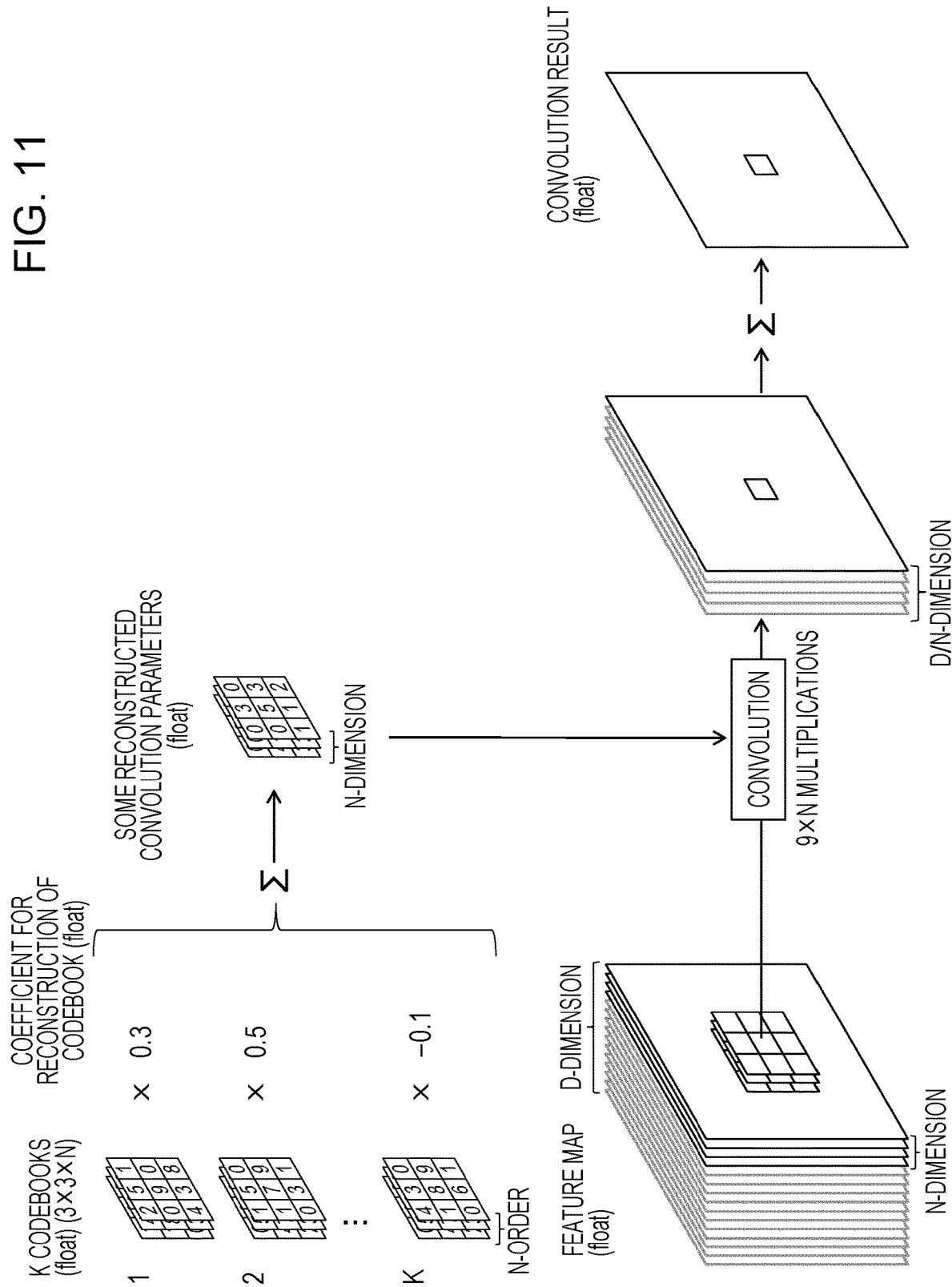
FIG. 11 is a diagram illustrating convolution calculation employing a reconstruction of weights according to a fourth embodiment.

FIG. 11 is a diagram illustrating a convolution calculation using a weight reconstruction, and FIG. 12 is a diagram illustrating a convolution calculation without using a weight reconstruction. A case where the codebook vector is a real number and a case where the codebook vector is binary will be described with reference to FIGS. 11 and 12. In the foregoing embodiments, the convolution parameters are reconstructed using K codebooks including real numbers as illustrated in FIG. 11 and the convolution calculation is performed. In this case, integration is to be performed 3×3×N times and addition is to be performed 3×3×N times for a convolution operation on a single portion illustrated in FIG. 11.

On the other hand, FIG. 12 is a diagram illustrating a case where a binary codebook vector is used. Note that this learning method will be described later. In this embodiment illustrated in FIG. 12, convolution of feature maps is performed for individual K codebook vectors without reconstructing a convolution kernel. Specifically, the following process is performed.

(1) With reference to 3×3×N elements of the codebook vector, a value of a feature map is read when a value is 1 and the value is added to a feature map addition result 1201. On the other hand, when the value is 0, the value is not added.

(2) When the process has been performed on the K codebooks, K feature map addition results 1201a to 1201k are multiplied by corresponding codebook coefficients and a sum total is obtained as a result of the convolution.

In this way, a convolution calculation on the single portion is completed. The number of times multiplication is performed for the convolution is K, and the number of times addition is performed for the convolution is 3×3×N×K+K. In particular, when a space size of convolution is large, such as a size of 5×5 or 7×7, since the number of times multiplication is performed is small in this embodiment, this embodiment is advantageous in terms of a size of a circuit or the like.

Next, a method for obtaining binary codebook vector by learning will be described. In this method, a codebook is learnt in accordance with Expression 8 below.

$$\min_{x, A} \Sigma_n \|c_n - Ax_n\|^2 + \lambda_1 |x_n| + \lambda_2 Q(A),$$

$$Q(A) = \Sigma_{ij} |a_{ij} - q_{nearest}| \qquad \text{Expression 8}$$

Expression 8 is obtained by generalizing Expression 3 of the third embodiment and includes a binary constraint term $Q(A)$ of the codebook. An term $q_{nearest}$ in $Q(A)$ is a variable of a value in binary $\{0, 1\}$ closer to a value of $a_{ij}$. The following process is performed to obtain a binary codebook vector in accordance with Expression 8 by learning.

First, all codebook vectors are initialized by a random number before learning is started. As the learning progresses, a value of $\lambda 2$ is gradually increased so that the value becomes close to binary. When the learning is converged, binarizing is finally performed using a threshold value 0 so that values of all elements of the codebook vectors are rounded to a binary $\{0, 1\}$. By this, a codebook having elements of values of binary are obtained.

Note that, as a modification of this embodiment, an element of a codebook may be a binary of $a \in \{-1, 1\}$ or a ternary of $a \in \{-1, 0, 1\}$. Furthermore, a discrete value may have arbitrary accuracy in a range from a binary to n bits. Furthermore, accuracy of the discrete value may be changed every codebook vector. Moreover, a plurality of constant values may be set as elements of the codebook vector. In this embodiment, the codebook vector may be represented by a small number of bits since a reference table is additionally used.

Furthermore, in addition to the codebook vector, a codebook coefficient may be discretized in various methods described above.

Furthermore, as another modification, as disclosed in Matthieu Courbariaux, Yoshua Bengio, and Jean-Pierre David, BinaryConnect: Training Deep Neural Networks with binary weights during propagations, NIPS 2015, an embodiment in which a special neural network including values of weight of the neural network constituted by a binary $\{-1, 1\}$ or a ternary $\{-1, 0, 1\}$ is approximated may be considered. In this case, a codebook vector or a codebook coefficient may be a binary or a real value. In the case where a value of a weight of the neural network is a binary $\{-1, 1\}$, threshold-based processing is performed in accordance with Expression 9 below when a weight parameter is reconstructed.

$$c_{(i,j)} = \text{sign}(\Sigma_m \in \{\text{Top}(K)\} x_{(i, j, m)} a_m) \qquad \text{Expression 9}$$

According to this embodiment, a memory size may be further reduced and a calculation load amount may be further reduced using a binary codebook. Note that, as described above, various modifications of a codebook vector, a codebook coefficient, and a weight parameter which is a target of reconstruction may be made. However, this embodiment is not limited to a specific embodiment and an appropriate configuration is employed based on a required compression rate and approximation accuracy, or the like.

Other Embodiments

The present invention is realized when software (programs) which realizes the functions in the foregoing embodiments is supplied to a system or an apparatus through a network and a computer (or a CPU) included in the system or the apparatus reads and executes the programs. Furthermore, the present invention may be applied to a system including a plurality of devices or to an apparatus including a single device. The present invention is not limited to the foregoing embodiments, and various modifications (including organic combinations of the embodiments) may be made based on the scope of the invention, and the modifications are also included in the scope of the present invention. Specifically, combinations of the foregoing embodiments and the modifications are also included in the present invention.

According to the present invention, approximation may be performed on sparse weights, such as weight parameters in higher layers of the CNN, by a general method.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188412 filed Sep. 27, 2016 which is hereby incorporated by reference herein in its entirety.

What is claimed is:

1. An information processing apparatus comprising:
one or more processors and one or more memories,
wherein the one or more processors performs, by executing programs stored in the one or more memories:
determining a plurality of three-dimensional blocks in which a four-dimensional weight parameter between a L layer and a layer next to the L layer of a neural network is divided, wherein the plurality of three-dimensional blocks are blocks in which a feature channel of the four-dimensional weight parameter having a number of channels based on a number of feature channels in the L layer and a number of feature channels in the next layer of the L layer of the neural network is divided by an integer value; and
encoding the four-dimensional weight parameter by approximating the plurality of three-dimensional blocks respectively by a linear combination of (a) codebook coefficients, and (b) two or more different three-dimensional codebook vectors, selected from a set of three-dimensional codebook vectors having a same channel size as the three-dimensional block, wherein the two or more different three-dimensional codebook vectors are part of a set of three-dimensional codebook vectors,
wherein three-dimensional codebook vectors are a predetermined number of three-dimensional codebook vectors selected with priority given to codebook vectors having larger absolute value.

2. The information processing apparatus according to claim 1, wherein the one or more processors divides the four-dimensional weight parameter into a plurality of groups after aligning the four-dimensional weight parameter by a predetermined method.

3. The information processing apparatus according to claim 1, wherein the four-dimensional weight parameter has elements of a binary value or a ternary value.

4. An information processing apparatus comprising:
one or more processors and one or more memories,
wherein the one or more processors performs, by executing programs stored in the one or more memories:
determining a plurality of three-dimensional blocks in which a four-dimensional weight parameter between a L layer and a layer next to the L layer of a neural network is divided, wherein the plurality of three-dimensional blocks are blocks in which a feature channel of the four-dimensional weight parameter having a number of channels based on a number of feature channels in the L layer and a number of feature channels in the next layer of the L layer of the neural network is divided by an integer value;
encoding the four-dimensional weight parameter by approximating the plurality of three-dimensional blocks respectively by a linear combination of (a) codebook coefficients, and (b) two or more different three-dimensional codebook vectors, selected from a set of three-dimensional codebook vectors having a same channel size as the three-dimensional block, wherein the two or more different three-dimensional codebook vectors are part of a set of three-dimensional codebook vectors; and
reconstructing the four-dimensional weight parameter by a linear sum of a codebook coefficient determined by the one or more processors and a corresponding codebook vector that corresponds to the codebook coefficient,
wherein a weight coefficient is determined by optimizing a loss function including a loss term of approximation accuracy of the four-dimensional weight parameter of the neural network and a loss term as a sparse term of the weight coefficient.

5. The information processing apparatus according to claim 4,
wherein the one or more processors reads and uses different codebook sets depending on a layer of the neural network which is a reconstruction target of the four-dimensional weight parameter.

6. The information processing apparatus according to claim 4, wherein at least one of the weight coefficient and the codebook vector has a binary value or a ternary value as an element.

7. The information processing apparatus according to claim 4, wherein the one or more processors further function as allowing a user to instruct a constraint condition on a learning parameter.

8. The information processing apparatus according to claim 4, wherein the neural network is a convolutional neural network.

9. An information processing method comprising:
determining a plurality of three-dimensional blocks in which a four-dimensional weight parameter between a L layer and a layer next to the L layer of a neural network is divided, wherein the plurality of three-dimensional blocks are blocks in which a feature channel of the four-dimensional weight parameter having a number of channels based on a number of feature channels in the L layer and a number of feature channels in the next layer of the L layer of the neural network is divided by an integer value; and
encoding the four-dimensional weight parameter by approximating the plurality of three-dimensional blocks respectively by a linear combination of (a) codebook coefficients, and (b) two or more different three-dimensional codebook vectors, selected from a set of three-dimensional codebook vectors having a same channel size as the three-dimensional block, wherein the two or more different three-dimensional codebook vectors are part of a set of three-dimensional codebook vectors,
wherein three-dimensional codebook vectors are a predetermined number of three-dimensional codebook vectors selected with priority given to codebook vectors having larger absolute value.

10. A computer-readable storage medium storing a program which causes a computer to execute an information processing method, the method comprising:
determining a plurality of three-dimensional blocks in which a four-dimensional weight parameter between a L layer and a layer next to the L layer of a neural network is divided, wherein the plurality of three-dimensional blocks are blocks in which a feature channel of the four-dimensional weight parameter having a number of channels based on a number of feature channels in the L layer and a number of feature channels in the next layer of the L layer of the neural network is divided by an integer value; and encoding the four-dimensional weight parameter by approximating the plurality of three-dimensional blocks respectively by a linear combination of (a) codebook coefficients, and (b) two or more different three-dimensional codebook vectors, selected from a set of three-dimensional codebook vectors having a same channel size as the three-dimensional block, wherein the two or more different three-dimensional codebook vectors are part of a set of three-dimensional codebook vectors, wherein three-dimensional codebook vectors are a predetermined number of three-dimensional codebook vectors selected with priority given to codebook vectors having larger absolute value.

11. The information processing apparatus according to claim 7, wherein the one or more processors performs learning such that the instructed constraint condition is satisfied and then encodes the four-dimensional weight parameter based on a result of the learning.

12. The information processing apparatus according to claim 11, wherein the one or more processors receives, from the user, an instruction of the constraint condition regarding a memory, and wherein the one or more processors encodes the four-dimensional weight parameter such that the four-dimensional weight parameter after compression coding becomes able to be stored into the memory.

13. The information processing apparatus according to claim 1, wherein the one or more processors encodes the four-dimensional weight parameter using a codebook that differs depending on a pixel size of a convolution calculation in a convolution layer of the convolutional neural network.

14. The information processing apparatus according to claim 1, wherein the one or more processors divides the four-dimensional weight parameter into the plurality of groups such that the four-dimensional weight parameter after division is equal in size.

15. An information processing method, comprising:

determining a plurality of three-dimensional blocks in which a four-dimensional weight parameter between a L layer and a layer next to the L layer of a neural network is divided, wherein the plurality of three-dimensional blocks are blocks in which a feature channel of the four-dimensional weight parameter having a number of channels based on a number of feature channels in the L layer and a number of feature channels in the next layer of the L layer of the neural network is divided by an integer value;

encoding the four-dimensional weight parameter by approximating the plurality of three-dimensional blocks respectively by a linear combination of (a) codebook coefficients, and (b) two or more different three-dimensional codebook vectors, selected from a set of three-dimensional codebook vectors having a same channel size as the three-dimensional block, wherein the two or more different three-dimensional codebook vectors are part of a set of three-dimensional codebook vectors; and reconstructing the four-dimensional weight parameter by a linear sum of a codebook coefficient determined by the one or more processors and a corresponding codebook vector that corresponds to the codebook coefficient, wherein a weight coefficient is determined by optimizing a loss function including a loss term of approximation accuracy of the four-dimensional weight parameter of the neural network and a loss term as a sparse term of the weight coefficient.

* * * * *

UNITED STATES PATENT AND TRADEMARK OFFICE
CERTIFICATE OF CORRECTION

PATENT NO. : 11,720,786 B2
APPLICATION NO. : 15/713470
DATED : August 8, 2023
INVENTOR(S) : Shunta Tate et al.

It is certified that error appears in the above-identified patent and that said Letters Patent is hereby corrected as shown below:

In the Claims

Column 13, Line 17 in Claim 1, cancel the text "determining" and insert the following text: --reading, from a storage unit, (a) codebook coefficients, and (b) two or more different three-dimensional codebook vectors, selected from a set of three-dimensional codebook vectors representing--

Column 13, Lines 17-18 in Claim 1, cancel the text "in which" and insert the following text: --corresponding to--

Column 13, Line 20 in Claim 1, cancel the text "is divided"

Column 13, Line 27 in Claim 1, cancel the text "encoding" and insert the following text: --constructing--

Column 13, Line 30 in Claim 1, cancel the text "codebook coefficients" and insert the following text: --the codebook coefficients--

Column 13, Line 30 in Claim 1, cancel the text "two or more" and insert the following text: --the two or more--

Column 13, Line 31 in Claim 1, cancel the text "a" and insert the following text: --the--

Column 13, Line 40 in Claim 1, cancel the text "absolute value" and insert the following text: --absolute value of codebook coefficients--

Column 14, Line 34 in Claim 9, cancel the text "determining" and insert the following text: --reading, from a storage unit, (a) codebook coefficients, and (b) two or more different three-dimensional codebook vectors, selected from a set of three-dimensional codebook vectors representing--

Column 14, Lines 34-35 in Claim 9, cancel the text "in which" and insert the following text:

Signed and Sealed this
Thirteenth Day of May, 2025

Coke Morgan Stewart
*Acting Director of the United States Patent and Trademark Office*

CERTIFICATE OF CORRECTION (continued)
U.S. Pat. No. 11,720,786 B2

--corresponding to--

Column 14, Line 37 in Claim 9, cancel the text "is divided"

Column 14, Line 44 in Claim 9, cancel the text "encoding" and insert the following text:
--constructing--

Column 14, Line 47 in Claim 9, cancel the text "codebook coefficients" and insert the following text:
--the codebook coefficients--

Column 14, Line 47 in Claim 9, cancel the text "two or more" and insert the following text: --the two or more--

Column 14, Line 48 in Claim 9, cancel the text "a" and insert the following text: --the--

Column 14, Line 57 in Claim 9, cancel the text "absolute value" and insert the following text:
--absolute value of codebook coefficients--

Column 14, Line 61 in Claim 10, cancel the text "determining" and insert the following text:
--reading, from a storage unit, (a) codebook coefficients, and (b) two or more different three-dimensional codebook vectors, selected from a set of three-dimensional codebook vectors representing--

Column 14, Lines 61-62 in Claim 10, cancel the text "in which" and insert the following text:
--corresponding to--

Column 14, Line 64 in Claim 10, cancel the text "is divided"

Column 15, Line 4 in Claim 10, cancel the text "encoding" and insert the following text:
--constructing--

Column 15, Line 7 in Claim 10, cancel the text "codebook coefficients" and insert the following text:
--the codebook coefficients--

Column 15, Line 7 in Claim 10, cancel the text "two or more" and insert the following text: --the two or more--

Column 15, Line 8 in Claim 10, cancel the text "a" and insert the following text: --the--

Column 15, Line 18 in Claim 10, cancel the text "absolute value" and insert the following text:
--absolute value of codebook coefficients--